United States Patent
Vos et al.

(10) Patent No.: US 8,229,606 B2
(45) Date of Patent: Jul. 24, 2012

(54) SYSTEMS AND METHODS FOR ESTIMATING POSITION, ATTITUDE, AND/OR HEADING OF A VEHICLE

(75) Inventors: David William Vos, Delaplane, VA (US); Vladislav Gavrilets, Fairfax, VA (US)

(73) Assignee: Rockwell Collins Control Technologies, Inc., Cedar Rapids, IA (US)

( * ) Notice: Subject to any disclaimer, the term of this patent is extended or adjusted under 35 U.S.C. 154(b) by 920 days.

(21) Appl. No.: 11/628,115

(22) PCT Filed: Jun. 2, 2005

(86) PCT No.: PCT/US2005/019435
§ 371 (c)(1),
(2), (4) Date: Feb. 14, 2008

(87) PCT Pub. No.: WO2005/119387
PCT Pub. Date: Dec. 15, 2005

(65) Prior Publication Data
US 2008/0269963 A1  Oct. 30, 2008

Related U.S. Application Data

(60) Provisional application No. 60/576,021, filed on Jun. 2, 2004.

(51) Int. Cl.
| G05D 1/00 | (2006.01) |
| G05D 1/08 | (2006.01) |
| G05D 3/00 | (2006.01) |
| G06F 7/00 | (2006.01) |
| G06F 17/00 | (2006.01) |

(52) U.S. Cl. ............... 701/4; 701/3; 701/14; 244/3.15; 244/3.2; 244/171; 244/76 R

(58) Field of Classification Search ............ 701/220, 701/3–7, 14; 244/3.15, 3.2, 3.21, 164–166, 244/171, 75.1, 76 R, 79, 76 B
See application file for complete search history.

(56) References Cited

U.S. PATENT DOCUMENTS
4,220,994 A * 9/1980 Hendrickson ............ 701/217
4,343,035 A   8/1982 Tanner
(Continued)

FOREIGN PATENT DOCUMENTS
WO   WO 2005/083358 A1   9/2005

OTHER PUBLICATIONS

Supplementary European Search Report issued Feb. 3, 2010, in counterpart EP App. No. EP 05 758 536.6.

*Primary Examiner* — Hussein Elchanti
*Assistant Examiner* — Rami Khatib
(74) *Attorney, Agent, or Firm* — Finnegan, Henderson, Farabow, Garrett & Dunner, L.L.P.

(57) ABSTRACT

A system for estimating at least one of position, attitude, and heading of a vehicle is disclosed. The system includes at least three gyroscopes configured to output a signal indicative of inertial angular rates around three mutually orthogonal axes of the vehicle and at least three accelerometers configured to output a signal indicative of accelerations along three mutually orthogonal axes of the vehicle. The system further includes a triaxial magnetometer configured to output a signal indicative of a projection of ambient magnetic field on three mutually orthogonal axes of the vehicle. The system also includes a sensor configured to output a signal indicative of vehicle altitude and a differential pressure sensor configured to output a signal indicative of airspeed of the vehicle. The system further includes a device configured to receive the signals and estimate at least of one of position, attitude, and heading of the vehicle.

34 Claims, 1 Drawing Sheet

U.S. PATENT DOCUMENTS

| | | | |
|---|---|---|---|
| 4,608,641 A * | 8/1986 | Snell ................................ 701/4 |
| 4,914,598 A | 4/1990 | Krogmann et al. |
| 5,075,693 A * | 12/1991 | McMillan et al. ............ 342/457 |
| 5,890,441 A * | 4/1999 | Swinson et al. ............. 244/12.3 |
| 6,463,366 B2 * | 10/2002 | Kinashi et al. .................. 701/13 |
| 6,941,806 B2 * | 9/2005 | Burns et al. ................ 73/170.02 |
| 2002/0116126 A1 | 8/2002 | Lin |
| 2003/0135327 A1 * | 7/2003 | Levine et al. ................. 701/220 |

* cited by examiner

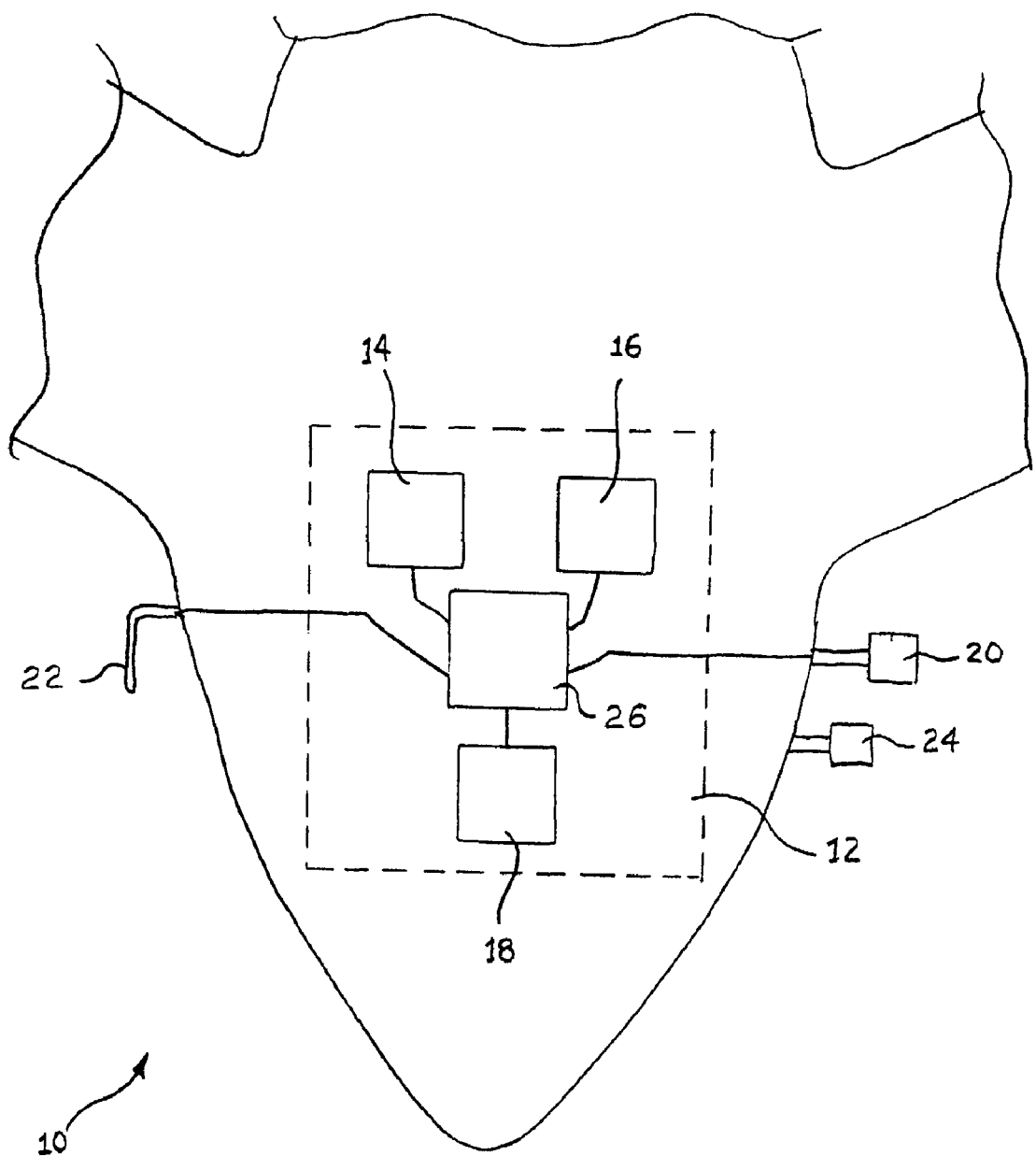

SYSTEMS AND METHODS FOR ESTIMATING POSITION, ATTITUDE, AND/OR HEADING OF A VEHICLE

RELATED APPLICATIONS

This application claims the benefit of priority under 35 U.S.C. §119(e) of U.S. Provisional Application No. 60/576,021, filed on Jun. 2, 2004, the disclosure of which is incorporated herein by reference.

DESCRIPTION OF THE INVENTION

1. Field of the Invention

The present disclosure relates to systems and methods for estimating the position, attitude, and/or heading of a vehicle. In particular, the present disclosure relates to systems and methods for estimating the position, attitude, and/or heading of an aerial vehicle based on signals received from sensors.

2. Background of the Invention

In a high-accuracy strapdown inertial navigation system, angular rate sensor readings may be used to estimate vehicle attitude, which is usually represented as either a set of Euler angles (i.e., pitch, roll, and heading), a set of quaternions, and/or a direction cosine matrix. Using an inertial navigation algorithm, the estimated attitude information may then be used to transform body-axis accelerometer measurements to a navigation frame such as local North, East, and Down (NED) axes. The resulting inertial accelerations may be integrated to determine estimated inertial velocities, and the estimated inertial velocities may, in turn, be integrated to estimate the vehicle's position.

An inertial navigation algorithm may provide sufficiently accurate results if the attitude information derived from sensors such as, for example, gyroscopes (gyros) is reasonably accurate. Relatively inexpensive gyros, sometimes referred to as "tactical-grade" gyros may exhibit drift rates of about 1 degree per hour. Such gyros may be normally used for navigation of, for example, tactical missiles or other precision weapons that typically have relatively short flight times of about several minutes. Furthermore, current low-cost, micro-machined, angular rate sensors often exhibit drift rates over about 300 degrees per hour, which result in very inaccurate attitude and/or heading estimations. On the other hand, significantly more accurate gyros, sometimes referred to as "navigation gyros" may be used for navigation of, for example, airliners, strategic missiles, and submarines. Navigation gyros may exhibit drift rates of about 0.01 degree per hour or less. Navigation gyros, however, are often prohibitively expensive and/or too large and complex for many applications.

A much less expensive and much less accurate alternative to inertial navigation may be obtained by the use of what is sometimes referred to as "dead-reckoning" algorithms. The principle behind dead reckoning is to estimate the direction in which a vehicle is traveling (e.g., using a magnetic compass or bearings to known stars) and estimate the speed at which the vehicle it is traveling to determine a speed vector and to integrate the speed vector over time to obtain vehicle location.

For an aerial vehicle such as an airplane, the speed measurement may be determined by a true airspeed measurement, for example, via a Pitot pressure sensor and an ambient air temperature sensor. While airspeed can be measured quite accurately, for example, to within one mile per hour, ground speed may be measured only as accurately as the knowledge of the wind speed and direction. In some cases, wind speed and direction may be provided by updates from the ground, for example, via weather reports to pilots. In other cases, wind speed and direction may be estimated during part of the flight via a navigation aid, such as, for example, a global positioning system (GPS). When the navigation aid is not present, the wind speed and direction information may remain adequately accurate for a short period of time. Low-cost, tactical unmanned aircraft may be equipped with GPS. The use of GPS, however, may be temporarily lost, for example, due to jamming in a hostile environment.

In addition, attitude and heading estimation for a vehicle not equipped with expensive inertial navigation systems may be performed using an attitude-and-heading-reference-system, sometime referred to as "AHRS." Such AHRS systems commonly use either mechanical spinning gyros (i.e., a vertical gyro for attitude estimation and a directional gyro for heading estimation), or strapdown systems using either gravity aiding and/or kinematic aiding. Kinematic aiding necessarily requires making assumptions about the vehicle's kinematics. For example, a fixed wing aircraft can be assumed to have a relatively simple relationship between turn rate and bank angle during coordinated flight. This assumption would not be valid, however, for a vehicle that does not necessarily make coordinated turns, such as, for example, a helicopter.

As a result of the above-mentioned drawbacks, it may be desirable to provide systems and methods that provide a relatively lost cost solution to vehicle's position, attitude, and heading estimation. It may also be desirable to provide systems and methods that do not rely on GPS to estimate vehicle position, attitude, and/or heading. It may further be desirable to provide systems and methods that do not require assumptions about the vehicle's kinematics in order to provide accurate position, attitude and heading estimations.

There may exist a desire to overcome one or more of the above-mentioned drawbacks. The exemplary disclosed systems and methods may seek to satisfy one or more of the above-mentioned drawbacks. Although the presently disclosed systems and methods may obviate one or more of the above-mentioned drawbacks, it should be understood that some aspects of the disclosed systems and methods might not necessarily obviate them.

SUMMARY OF THE INVENTION

In the following description, certain aspects and embodiments will become evident. It should be understood that the invention, in its broadest sense, could be practiced without having one or more features of these aspects and embodiments. It should be understood that these aspects and embodiments are merely exemplary.

In one aspect, as embodied and broadly described herein, the invention includes a system for estimating at least one of position, attitude, and heading of a vehicle. The system includes at least three gyroscopes configured to output a signal indicative of inertial angular rates around three mutually orthogonal axes of the vehicle and at least three accelerometers configured to output a signal indicative of accelerations along three mutually orthogonal axes of the vehicle. The system further includes a triaxial magnetometer configured to output a signal indicative of a projection of ambient magnetic field on three mutually orthogonal axes of the vehicle. The system also includes a sensor configured to output a signal indicative of altitude and a differential pressure sensor configured to output a signal indicative of airspeed of the vehicle. The system also includes a device configured to receive the signals to estimate at least one of the position, the attitude, and the heading of the vehicle.

According to another aspect, a vehicle includes a system for estimating at least one of position, attitude, and heading of the vehicle. The system includes at least three gyroscopes configured to output a signal indicative of inertial angular rates around three mutually orthogonal axes of the vehicle and at least three accelerometers configured to output a signal indicative of accelerations along three mutually orthogonal axes of the vehicle. The system further includes a triaxial magnetometer configured to output a signal indicative of a projection of ambient magnetic field on three mutually orthogonal axes of the vehicle. The system also includes a senor configured to output a signal indicative of vehicle altitude and a differential pressure sensor configured to output a signal indicative of airspeed of the vehicle. The system further includes a device configured to receive the signals and estimate at least one of the position, the attitude, and the heading of the vehicle.

According to yet a further aspect, a method for estimating at least one of position, attitude, and heading of a vehicle includes generating signals indicative of inertial angular rates around three mutually orthogonal axes of the vehicle, accelerations along three mutually orthogonal axes of the vehicle, a projection of ambient magnetic field on three mutually orthogonal axes of the vehicle, vehicle altitude, and airspeed of the vehicle. The method further includes estimating at least one of the position, the attitude, and the heading of the vehicle based on the signals.

Aside from the structural and procedural arrangements set forth above, the invention could include a number of other arrangements, such as those explained hereinafter. It is to be understood, that both the foregoing description and the following description are exemplary.

BRIEF DESCRIPTION OF THE DRAWING

The accompanying drawing is incorporated in and constitutes a part of this specification. The drawing illustrates an exemplary embodiment of the invention and, together with the description, serves to explain some principles of the invention.

FIG. 1 is a schematic view of a vehicle including an exemplary system for estimating vehicle position, attitude, and heading.

DESCRIPTION OF THE EMBODIMENTS

Reference will now be made in detail to some exemplary embodiments of the invention, an example of which is illustrated in the accompanying drawing. Wherever possible, the same reference numbers are used in the drawing and the description to refer to the same or like parts.

The exemplary systems and methods for estimating an aerial vehicle's position, attitude, and/or heading, which are described herein use an exemplary dead-reckoning navigation algorithm. The systems and methods may provide a relatively low-cost, strapdown, micro-machined group of sensors.

Currently, relatively low-cost, micro-machined angular rate sensors exhibit drift rates over about 300 degrees per hour, which result in very inaccurate attitude and/or heading estimates. In order to prevent the prohibitively high drift rates and maintain accurate attitude and/or heading estimations, additional information may be used to supplement the sensor information. This information may be obtained from other sensors and may be input into the exemplary dead-reckoning algorithm. According to some exemplary embodiments, the systems and methods provide zero-drift attitude and heading information using a combination of measurement updates, for example, including measurements from a triaxial magnetometer, a pressure altimeter, and a forward acceleration from an accelerometer. Some exemplary systems and methods may use a GPS system to provide updated estimates of vehicle position.

For example, a vehicle 10 shown in FIG. 1 may include an exemplary sensor system 12 for estimating position, attitude, and/or heading. Although the vehicle 10 depicted in FIG. 1 is a fixed-wing aircraft, the vehicle 10 may be an aerial vehicle such as, for example, a ducted aerial vehicle, a missile, or a helicopter. The vehicle 10 may be manned or unmanned.

The sensor system 12 may include three gyros 14, three accelerometers 16, a triaxial magnetometer 18, a pressure altimeter 20, a differential pressure sensor 22, a temperature sensor 24, and a CPU implementing an Extended Kalman Filter (EKF) 26. The gyros 14 may be relatively low-cost gyros, which measure inertial angular rates around three mutually orthogonal vehicle axes. The three accelerometers 16 measure inertial accelerations along three mutually orthogonal vehicle axes. The triaxial magnetometer 18 measures the projection of the ambient magnetic field on three mutually orthogonal vehicle axes. The pressure altimeter 20 is an absolute pressure sensor, which measures ambient static pressure, and the differential pressure sensor 22 measures Pitot pressure or indicated airspeed. The temperature sensor 24 measures the air temperature outside the vehicle.

Information from the three gyros 14, the three accelerometers 16, the triaxial magnetometer 18, the pressure altimeter 20, the differential pressure sensor 22, and the temperature sensor 24 is input into the EKF 26 and is blended in a Kalman filter framework.

A common, handheld compass provides direction to Earth's magnetic North. If a vehicle location is approximately known, the difference between the direction the vehicle is traveling and the magnetic and true North pole, called "magnetic variation," can be corrected. Many vehicle onboard computers have sufficient memory to store a worldwide map of Earth magnetic field vector, which may provide the information needed for such correction.

The triaxial magnetometer 18 provides a measurement of the ambient magnetic field vector in projection to the vehicle axes, sometimes referred to as "body axes," provides an indirect measurement of two out of three rotation angles (i.e., pitch, roll, and yaw) (except for the rotation around the local ambient field, which does not change a field projection on the body axes).

The pressure altimeter 20 provides an indirect measurement of vehicle attitude estimation error based on the following principle. Current body-axes accelerometers are very accurate, and the projection of inertial acceleration on the NED vertical axis will be determined by the accuracy of the attitude estimate. The measured vertical acceleration is added to the acceleration due to gravity. Integration of the combined vertical acceleration will provide vertical velocity. If the derived vertical velocity shows that the vehicle is climbing, while an accurate pressure altimeter shows that the vehicle is descending, there is an error in the estimation of vehicle attitude. The exemplary dead-reckoning algorithm described below mathematically incorporates information from the pressure altimeter 20 into the vehicle attitude estimation.

During steady, level flight, forward acceleration provides information about vehicle pitch angle. A side accelerometer, however, does not necessarily provide information about bank angle. In particular, a fixed-wing aircraft in a coordinated turn will have substantially zero side acceleration in the same manner that a passenger on an airliner does not slide sideways in the seat when an aircraft banks to turn. The side component of acceleration with respect to the plane remains substantially zero, although acceleration with respect to the ground is not zero.

The following discussion describes exemplary algorithms referred to herein as the "zero-drift attitude and heading estimation algorithm."

The EKF 26 is configured to blend information received from the exemplary sensor system 12 described above to yield an optimal (in a minimum error covariance sense) attitude estimate. The EKF 26's operations include two steps: 1) time propagation of state estimate and error covariance, and 2) measurement update.

According to time propagation of the navigation vector, the navigation state vector estimate is given by the following equation:

$$\hat{X} = [\hat{h}\, \hat{V}_h\, \hat{q}\, \hat{\omega}_b]^T. \tag{1}$$

As used herein, $\hat{h}$ is baroinertial altitude, $\hat{V}_h$ is climb rate or vertical speed, $\hat{q} = [\hat{q}_0\, \hat{q}_1\, \hat{q}_2\, \hat{q}_3]^T$, which represents the quaternion representing vehicle attitude, and $\hat{\omega}_b = [\hat{\omega}_{xb}\, \hat{\omega}_{yb}\, \hat{\omega}_{zb}]^T$ is the vector of gyro bias estimates. The hat symbol (^) is used throughout the present application to denote estimates. The differential equations describing propagation of the navigation state vector (referred to in the following as "navigation equations") are:

$$\dot{\hat{h}} = \hat{V}_h; \tag{2}$$

$$\dot{\hat{V}} = -\hat{c}_{31}a_x - \hat{c}_{32}a_y - \hat{c}_{33}a_z - \hat{g}; \tag{3}$$

$$\dot{\hat{q}} = -\frac{1}{2}(\Omega_m - \hat{\Omega}_b)\hat{q}; \tag{4}$$

and $$\dot{\hat{\omega}} = 0. \tag{5}$$

As used herein, $(\hat{c}_{ij})$ are the elements of the direction cosine matrix corresponding to the current attitude estimate represented by the quaternion $(\hat{q})$, $a_x$, $a_y$, and $a_z$ are body axis accelerometer measurements, $\hat{g}$ is Earth gravity acceleration estimate, including Coriolis acceleration of the navigation frame due to Earth rotation rate, $\Omega_m$ is a 4×4 skew-symmetric matrix composed of angular rate measurements, $\hat{\Omega}_b$ is a 4×4 skew-symmetric matrix composed of gyro bias estimates. Equations (2-5) are discretized and integrated in a digital computer at the same rate as the sampling rate of the inertial sensors (e.g., the gyros 14 and accelerometers 16).

The state estimate error is defined in the following way. Let $X = [h\, V_h\, q\, \omega_b]^T$ be the true (unknown) navigation vector, and let $x = [\delta h\, \delta V_h\, \phi\, \mu]^T$ denote the error vector. As used herein, $\delta h = \hat{h} - h$, $\delta V_h = \hat{V}_h - V_h$, $\mu = \hat{\omega}_b - \omega_b$. The attitude error vector ($\phi = [\phi_x\, \phi_y\, \phi_z]^T$) is defined in the following way:

$$q = \exp\left(-\frac{1}{2}\Phi_4\right)\hat{q}. \tag{6}$$

It can be shown that this definition is equivalent to the definition based on the direction cosine matrix:

$$C = \hat{C} \exp(\Phi), \tag{7}$$

where the same attitude error vector $\phi$ is used to compose the 3×3 skew symmetric matrix $\Phi$:

$$\Phi = \begin{bmatrix} 0 & -\phi_z & \phi_y \\ \phi_z & 0 & -\phi_x \\ -\phi_y & \phi_x & 0 \end{bmatrix}. \tag{8}$$

Equation (7) provides a convenient physical interpretation of the defined attitude error vector ($\phi$): when its elements are small, they represent rotations around the estimated body axes required to reach the true attitude. Furthermore, linearization of Equation (7) yields:

$$C \approx \hat{C}(I + \Phi). \tag{9}$$

Using Equation (9) and differential equations for the direction cosine matrix, the linearized differential equations for the attitude error, as well as for the rest of the elements of the error vector can be derived as follows:

$$\delta\dot{h} = \delta V_h; \tag{10}$$

$$\delta\dot{V}_h = -[\hat{c}_{31}\, \hat{c}_{32}\, \hat{c}_{33}](a \times 100 + \eta); \text{ and} \tag{11}$$

$$\dot{\phi} = -(\hat{\omega}\times)\phi + \mu + \gamma. \tag{12}$$

Here, $\hat{\omega} = (\omega_m - \hat{\omega}_b - \hat{C}^T \hat{\omega}_n^e)$ is a vector of gyro measurements with the current bias estimates Earth rate ($\hat{\omega}_n^e$) subtracted, $\eta$ and $\gamma$ are random noise components of accelerometer and gyro measurement errors, and $\mu$ is a vector of gyro bias estimate errors, modeled as random walks. Equations (10-12) define linear differential equations for error propagation, and thus are used for deriving differential equations for error covariance propagation.

The measurement equation for a magnetometer with three sensitive axes is as follows:

$$Z = \hat{C}m, \tag{13}$$

where m is the magnetometer measurement vector. The residual vector is as follows:

$$z = \hat{C}m - b, \tag{14}$$

where b represents a known local magnetic field vector in the NED frame.

The measurement matrix for this measurement may be derived as follows using the linearized attitude error representation given by Equation (9):

$$z = \hat{C}C^T b - b \approx [\hat{C}(\hat{C} + \hat{C}\Phi)^T - I]b = -\hat{C}\Phi\hat{C}^T b = \\ -C[\phi \times \hat{C}^T b] = b \times \hat{C}\phi = B\hat{C}\phi \tag{15}$$

Here, B is a 3×3 skew-symmetric matrix composed of the elements of the local Earth magnetic field vector b.

The resulting measurement matrix for the full error vector is:

$$H_{3Dmag} = [0\ 0\ B\hat{C}\ 0_{3 \times 1}]. \tag{16}$$

The measurement covariance matrix for the magnetometer update is an identity multiplied by a constant $\sigma_m^2$. This constant reflects a relative accuracy of the magnetometer measurement.

The X-axis accelerometer update is based on steady-state, 1 g flight kinematics, and is used only when measured acceleration is close to 1 g. The measurement equation for the update is as follows:

$$z = g \sin \hat{\theta} - \hat{a}_x = 2g(\hat{q}_0\hat{q}_2 - \hat{q}_1\hat{q}_3) - \hat{a}_x. \tag{17}$$

An expression for the measurement matrix, which in this case is a row vector, may be derived as follows. Note that sin $\hat{\theta}=-\hat{c}_{31}$. Therefore, $$z = -g(\hat{C} - C)_{31} \qquad (18)$$
$$\approx -g(-\hat{C}\Phi)_{31}$$
$$= g(\hat{C}\Phi)_{31}$$
$$= [\hat{c}_{31} \ \hat{c}_{32} \ \hat{c}_{33}] \cdot \begin{bmatrix} 0 \\ \phi_z \\ -\phi_y \end{bmatrix}.$$

Thus, $$z = g(\hat{c}_{32}\phi_z - \hat{c}_{33}\phi_y). \qquad (19)$$

Note that in straight and level flight (likely a 1 g condition), the measurement error is approximately equal to $-g\phi_y$, which is an approximate pitch angle error. For example, if $\hat{\theta}-\theta>0$, then $\phi_y<0$. Thus, during the incorporation of the estimated attitude error into the quaternion estimate, the pitch attitude will be reduced by an amount proportional to $\phi_y$. The proportionality coefficient is a function of the Kalman filter gain.

Therefore, the measurement vector for the X-axis accelerometer update is as follows:

$$H_{a_x} = [0 \ 0 \ H_{a_x,\phi} \ 0_{1\times3}], \qquad (20)$$

where $H_{a_x,\phi} = g[0 - \hat{c}_{33} \ \hat{c}_{32}]$, based on Equation (19).

The measurement variance for this update can be represented as $\sigma_{a_x}^2$, where $\sigma_{a_x}$ reflects the relative accuracy of the X-accelerometer measurement.

The altitude update may be provided by barometric altimeter, but may be also provided by other sensors (e.g., a GPS altitude, dynamic stereo vision, sonar, radar, and/or laser range finder). Pressure altitude update happens in all modes. The measurement equation is as follows:

$$z = \hat{P}_D + h_m, \qquad (21)$$

where $h_m$ represents altitude measurement. The measurement matrix (i.e., row vector) has a single unit element corresponding to the altitude error.

According to exemplary embodiments, in the absence of GPS, three types of measurement updates may be used to maintain an accurate attitude estimate: 3D magnetometer updates, barometric altimeter updates, and X-axis accelerometer updates. Given these updates, the attitude error vector ($\phi$), and, hence the gyro bias estimate error vector ($\mu$), are observable under most steady-state or dynamic flight conditions and are sustainable for a long period of time.

Assuming the attitude errors are small (which is a safe assumption when attitude error is observable), and the analysis may be limited to a linear case. The 3D magnetometer update lacks information about the rotation around the local Earth magnetic field vector, since such a rotation does not change the projection of the Earth magnetic field on the vehicle body axes. This is reflected by the vector product $\phi \times \hat{C}^T b$ in the expression for the 3D magnetometer residual error, given in Equation (15). To show observability, it must be ensured that at least one of the remaining two updates makes observable a component of the attitude error vector $\phi$ along the projection of the Earth magnetic field vector (b) on the body axes ($\hat{C}^T b$).

Since the X-axis accelerometer update is used only in a condition close to 1 g flight, based on Equation (20), the corresponding attitude measurement vector can be estimated by $H_{a_x,\phi} \approx [0 - g \ 0]$ (i.e., only the error rotation around body Y-axis ($-\phi_y$) is observed. Note that for 1 g flight, this is approximately the Euler pitch angle error. Mathematically, observability will be lost if $H_{a_x,\phi}$ is orthogonal to $\hat{C}^T b$. Physically, this means that the aerial vehicle is oriented in a way that its Y body axis is orthogonal to the local Earth magnetic field vector. In other words, observability is lost if the vehicle is headed exactly toward magnetic North or South in a straight and level flight. This is intuitively clear: in such conditions, a change in pitch attitude results in changing projections of Earth magnetic field on body X and Z axes only. Since the Earth magnetic field vector is, under these conditions, located in XZ body plane, the X-axis accelerometer update does not carry any new information, and there exists a linear combination of the roll and yaw errors, which is not observable from the magnetometer measurement.

Concerning altitude measurement, the vertical velocity error, being a derivative of the altitude error, is observable from the measurement. Based on a differential equation for the vertical velocity error, for example, Equation (11), in a straight and level 1 g flight, attitude errors are not observable from the vertical velocity measurement. This condition, however, is well covered by the X-axis accelerometer update, with the exception of a rather peculiar case of aircraft heading aligned strictly with magnetic North or East.

Concerning the observability in a steady, coordinated shallow turn, from Equation (11), neglecting accelerometer bias estimate errors:

$$\dot{v}_d = [0 \ 0 \ 1]\hat{C}(\hat{a} \times \phi) \qquad (22)$$
$$= [c_{31} \ c_{32} \ c_{33}] \begin{bmatrix} 0 & -a_z & a_y \\ a_z & 0 & -a_x \\ -a_y & a_x & 0 \end{bmatrix} \phi$$

Thus, $$\dot{v}_d = [c_{32}a_z - c_{33}a_y - c_{31}a_z + c_{33}a_x \ c_{31}a_y - c_{32}a_x]\phi. \qquad (23)$$

Under the coordinated turn assumption, $a_y = 0$, so the expression is further simplified to:

$$\dot{v}_d = [c_{32}a_z - c_{31}a_z + c_{33}a_x - c_{32}a_x]\phi. \qquad (24)$$

Furthermore, the estimated elements of the direction cosine matrix can be represented with the estimates of Euler angles as follows:

$$\hat{c}_{31} = -\sin\hat{\theta}, \ \hat{c}_{32} = \sin\hat{\phi}\cos\hat{\theta}, \ \hat{c}_{33} = \cos\hat{\phi}\cos\hat{\theta}. \qquad (25)$$

The accelerometer measurements can be written as functions of the load factor n and the angle of attack $\alpha$:

$$a_x = ng\sin\alpha, \ a_z = -ng\cos\alpha. \qquad (26)$$

Using small-angle approximations for the pitch angle estimate ($\hat{\theta}$), roll angle estimate ($\hat{\phi}$), and the angle of attack ($\alpha$), a further simplification follows:

$$\dot{v}_d = ng[-\hat{\phi} - \hat{\theta} + \alpha - \hat{\phi}\alpha]\phi = -ng(\hat{\phi}\phi_x + \hat{\gamma}\phi_y + \hat{\phi}\alpha\phi_z) \qquad (27)$$

Equation (27) provides an analytical insight into attitude observability from a vertical channel measurement. Since the angle of attack $\alpha$ is generally small, the body axis yaw error ($\phi_z$) is poorly observable. In a steady level turn ($\hat{\gamma}=0$), only body axis roll error ($\phi_x$) is observable. If an aircraft is climbing or descending in a turn, a combination of body axis roll and pitch errors is observable. Since during a turn, the aerial vehicle is changing heading, this update complements the 3D magnetometer to achieve full attitude observability.

If an aircraft is in a steady climbing, descending, or level flight, with a constant heading aligned either with magnetic North or South, observability is lost. It is unlikely that such a condition will persist for a duration sufficient for the attitude solution to diverge.

Assuming without restricting generality that the Pitot probe sensing airspeed is aligned with body X-axis (if this is not the case, angular offset can be easily taken into account), then airspeed measurement can be converted from body axes to local (NED) navigation frame using the attitude and/or heading estimate derived previously herein. If a wind vector estimate is available, the projection of true airspeed measurement on local horizontal plane may then compensate for wind. The wind-compensated airspeed provides an estimate of the ground speed vector, which may be integrated to yield an estimate of vehicle position.

It will be apparent to those skilled in the art that various modifications and variations can be made to the structure and methodology of the present disclosure. Thus, it should be understood that the disclosure is not limited to the examples discussed in the specification. Rather, the present disclosure is intended to cover modifications and variations.

What is claimed is:

1. A system for estimating at least one of position, attitude, and heading of a vehicle, the system comprising:
   at least three gyroscopes configured to output a signal indicative of inertial angular rates around three mutually orthogonal axes of the vehicle;
   at least three accelerometers configured to output a signal indicative of accelerations along three mutually orthogonal axes of the vehicle;
   a triaxial magnetometer configured to output a signal indicative of a projection of ambient magnetic field on three mutually orthogonal axes of the vehicle;
   a sensor configured to output a signal indicative of vehicle altitude;
   a differential pressure sensor configured to output a signal indicative of airspeed of the vehicle; and
   a device configured to receive the signals to estimate at least one of the position, the attitude, and the heading of the vehicle,
   wherein the device is configured to estimate the attitude of the vehicle based in part on the signal indicative of vehicle altitude, and
   wherein the signal indicative of vehicle altitude is used to estimate the attitude of the vehicle.

2. The system of claim 1, wherein the device configured to receive the signals comprises a Kalman filter.

3. The system of claim 1, wherein the device configured to receive the signals comprises a Kalman filter algorithm configured to receive the signals and estimate at least one of the position, the attitude, and the heading of the vehicle.

4. The system of claim 3, wherein the algorithm comprises a zero-drift algorithm configured to estimate at least one of the position, the attitude, and the heading of the vehicle.

5. The system of claim 4, wherein the algorithm further comprises a dead-reckoning algorithm configured to estimate at least one of the position, the attitude, and the heading of the vehicle.

6. The system of claim 5, wherein the Kalman filter algorithm is configured to receive the signal indicative of airspeed of the vehicle, a wind speed estimate, and attitude and heading estimates from the dead-reckoning algorithm.

7. The system of claim 1, wherein the device configured to receive the signals is configured to use the signals from at least one of the triaxial magnetometer, the absolute pressure sensor, and at least one of the accelerometers to update estimates of at least one of the position, the attitude, and the heading of the vehicle.

8. The system of claim 7, wherein the at least one accelerometer comprises an accelerometer configured to output signals indicative of forward acceleration of the vehicle.

9. The system of claim 1, further comprising a global positioning system configured to estimate the position of the vehicle.

10. The system of claim 1, wherein the at least three gyroscopes comprise mechanical spinning gyroscopes.

11. The system of claim 1, wherein the sensor configured to output a signal indicative of vehicle altitude comprises an absolute pressure sensor.

12. The system of claim 1, further comprising a temperature sensor configured to output a signal indicative of air temperature outside the vehicle.

13. A vehicle comprising:
   a system for estimating at least one of position, attitude, and heading of the vehicle, the system comprising
      at least three gyroscopes configured to output a signal indicative of inertial angular rates around three mutually orthogonal axes of the vehicle,
      at least three accelerometers configured to output a signal indicative of accelerations along three mutually orthogonal axes of the vehicle,
      a triaxial magnetometer configured to output a signal indicative of a projection of ambient magnetic field on three mutually orthogonal axes of the vehicle,
      a sensor configured to output a signal indicative of altitude,
      a differential pressure sensor configured to output a signal indicative of airspeed of the vehicle, and
      a device configured to receive the signals to estimate at least one of the position, the attitude, and the heading of the vehicle,
   wherein the device is configured to estimate the attitude of the vehicle based in part on the signal indicative of vehicle altitude, and
   wherein the signal indicative of vehicle altitude is used to estimate the attitude of the vehicle.

14. The vehicle of claim 13, wherein the vehicle comprises a fixed-wing aerial vehicle.

15. The vehicle of claim 13, wherein the vehicle comprises a ducted fan aerial vehicle.

16. The vehicle of claim 13, wherein the vehicle is an unmanned aerial vehicle.

17. The vehicle of claim 13, wherein the device configured to receive the signals comprises a Kalman filter.

18. The vehicle of claim 13, wherein the device configured to receive the signals comprises an algorithm configured to receive the signals and estimate at least one of the position, the attitude, and the heading of the vehicle.

19. The vehicle of claim 18, wherein the algorithm comprises a zero-drift algorithm configured to estimate at least one of the position, the attitude, and the heading of the vehicle.

20. The vehicle of claim 19, wherein the algorithm further comprises a dead-reckoning algorithm configured to estimate at least one of the position, the attitude, and the heading of the vehicle.

21. The vehicle of claim 20, wherein the Kalman filter algorithm is configured to receive the signal indicative of true airspeed of the vehicle, a wind speed estimate, and attitude and heading estimates from the dead-reckoning algorithm.

22. The vehicle of claim 13, wherein the device configured to receive the signals is configured to use the signals from at least one of the triaxial magnetometer, the absolute pressure sensor, and at least one of the accelerometers to update estimates of at least one of the position, the attitude, and the heading of the vehicle.

23. The vehicle of claim 22, wherein the at least one accelerometer comprises an accelerometer configured to output signals indicative of forward acceleration of the vehicle.

24. The vehicle of claim 13, further comprising a global positioning system configured to estimate the position of the vehicle.

25. The vehicle of claim 13, wherein the gyroscopes comprise mechanical spinning gyroscopes.

26. The vehicle of claim 13, wherein the sensor configured to output a signal indicative of vehicle altitude comprises an absolute pressure sensor.

27. The vehicle of claim 13, further comprising a temperature sensor configured to output a signal indicative of air temperature outside the vehicle.

28. A computer-implemented method for estimating at least one of position, attitude, and heading of a vehicle, the computer-implemented method comprising:
generating signals of indicative of
inertial angular rates around three mutually orthogonal axes of the vehicle,
accelerations along three mutually orthogonal axes of the vehicle,
a projection of ambient magnetic field on three mutually orthogonal axes of the vehicle,
vehicle altitude,
airspeed of the vehicle, and
temperature outside the vehicle; and
estimating via the computer at least one of the position, the attitude, and the heading of the vehicle based on the signals,
wherein the estimating comprises estimating the attitude of the vehicle based in part on the signal indicative of vehicle altitude, and
wherein the signal indicative of vehicle altitude is used to estimate the attitude of the vehicle.

29. The method of claim 28, wherein estimating at least one of the position, the attitude, and the heading of the vehicle comprises inputting the signals into a Kalman filter implemented by the computer.

30. The method of claim 28, wherein estimating at least one of the position, the attitude, and the heading of the vehicle comprises inputting the signals into an algorithm configured to receive the signals and estimate via the computer at least one of the position, the attitude, and the heading of the vehicle.

31. The method of claim 28, wherein estimating at least one of the position, the attitude, and the heading of the vehicle comprises inputting the signals into a zero-drift algorithm running on the computer configured to estimate at least one of the position, the attitude, and the heading of the vehicle.

32. The method of claim 31, wherein estimating at least one of the position, the attitude, and the heading of the vehicle comprises inputting estimations from the zero-drift algorithm into a dead-reckoning algorithm running on the computer configured to estimate at least one of the position, the attitude, and the heading of the vehicle.

33. The method of claim 32, wherein inputting estimations from the zero-drift algorithm into the Kalman filter algorithm comprises inputting signals into the computer indicative of true airspeed of the vehicle, a wind speed estimate, and attitude and heading estimates from the dead-reckoning algorithm.

34. The method of claim 28, wherein estimating at least one of the position, the attitude, and the heading of the vehicle comprises updating estimates via the computer of at least one of the position, the attitude, and the heading of the vehicle based on signals from at least one of a triaxial magnetometer, an absolute pressure sensor, and at least one accelerometer.

* * * * *